(12) United States Patent
Morimoto et al.

(10) Patent No.: US 7,956,289 B2
(45) Date of Patent: Jun. 7, 2011

(54) CONDUIT AND CONTROL CABLE

(75) Inventors: Keizo Morimoto, Takarazuka (JP);
Akira Tsuda, Takarazuka (JP)

(73) Assignee: Hi-Lex Corporation, Takarazuka-Shi, Hyogo (JP)

( * ) Notice: Subject to any disclaimer, the term of this patent is extended or adjusted under 35 U.S.C. 154(b) by 582 days.

(21) Appl. No.: 11/966,567

(22) Filed: Dec. 28, 2007

(65) Prior Publication Data
US 2008/0196538 A1 Aug. 21, 2008

(30) Foreign Application Priority Data

Dec. 28, 2006 (JP) ................................ 2006-355654

(51) Int. Cl.
*H01B 7/00* (2006.01)
(52) U.S. Cl. ....................................................... 174/108
(58) Field of Classification Search .............. 174/102 R, 174/108, 111
See application file for complete search history.

(56) References Cited

U.S. PATENT DOCUMENTS

| | | | | | |
|---|---|---|---|---|---|
| 2,092,898 | A | * | 9/1937 | Tondeur | 464/174 |
| 2,136,258 | A | * | 11/1938 | Vrooman | 174/43 |
| 7,145,768 | B2 | * | 12/2006 | Hillman et al. | 361/679.06 |

FOREIGN PATENT DOCUMENTS

| | | | |
|---|---|---|---|
| JP | 58-193921 | * | 11/1983 |
| JP | H06-8335 | U | 3/1994 |

* cited by examiner

*Primary Examiner* — Chau N Nguyen
(74) *Attorney, Agent, or Firm* — Browdy and Neimark, PLLC (57) ABSTRACT

An outer casing of a control cable has a small stroke loss and a small variation of freeplay length, even when the degree of bending varies. An outer casing is formed so that an armor layer of two threads configuration is formed, in which a trapezoidal wire made of metal and a round wire 17 or an oval wire are respectively aligned and wound spirally, and on the surface of the armor layer, a coating made of synthetic resin is provided. A control cable is formed so that an inner cable is inserted into the outer casing. The ratio of width in the axis direction of the round wire 17 or the oval wire to the width of the bottom of the trapezoidal wire 16 is 0.3 to 2, the ratio of the thickness of the round wire 17 or the oval wire to the thickness of the trapezoidal wire is 0.5 to 1, the ratio of the winding pitch P of the spiral to the outer diameter D2 of the armor layer 13 is 0.25 to 0.8.

3 Claims, 7 Drawing Sheets

CONDUIT AND CONTROL CABLE

FIELD OF THE INVENTION

This invention relates to an outer casing and a control cable using the same.

BACKGROUND ART

Patent Document 1: Japanese Utility Model No. H06-8335
Patent Document 2: Japanese Published Patent Application No. S59-200806

Figure 12:
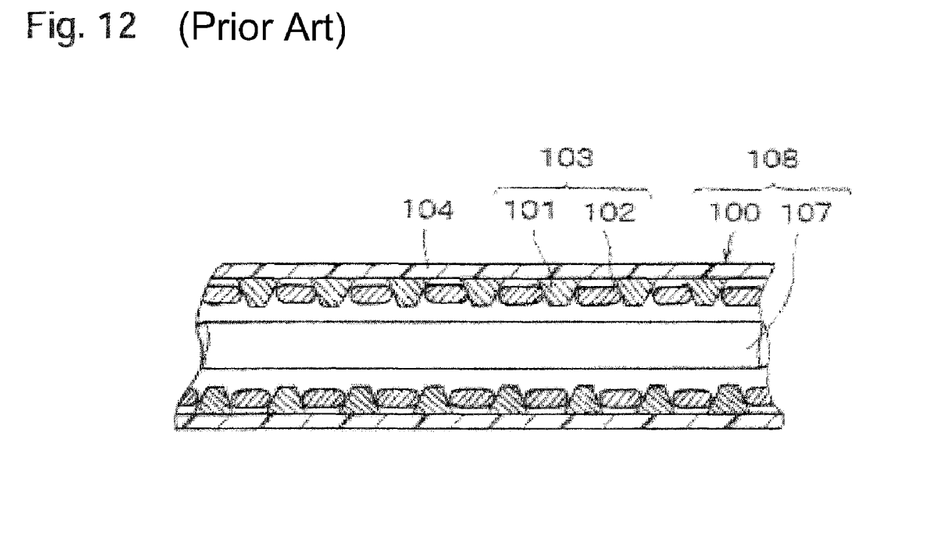
FIG. 12 is a cross section showing an example of conventional outer casing.

Patent document 1 proposes an outer casing 100 shown in FIG. 12 uses for a control cable of a remote control of a working robot, in which a spiral tube (armor layer) 103 is constituted by arranging alternately an irregular shape wire 101 of trapezoidal cross section and an oval wire 102 of flat and about oval cross section, and a synthetic resin layer 104 is provided around the periphery of the spiral tube 103. In this outer casing 100, the thickness of the irregular shape wire is about 2 times of the thickness of the oval wire 102. The oval wire can be obtained by milling a circular metal wire.

Figure 13:
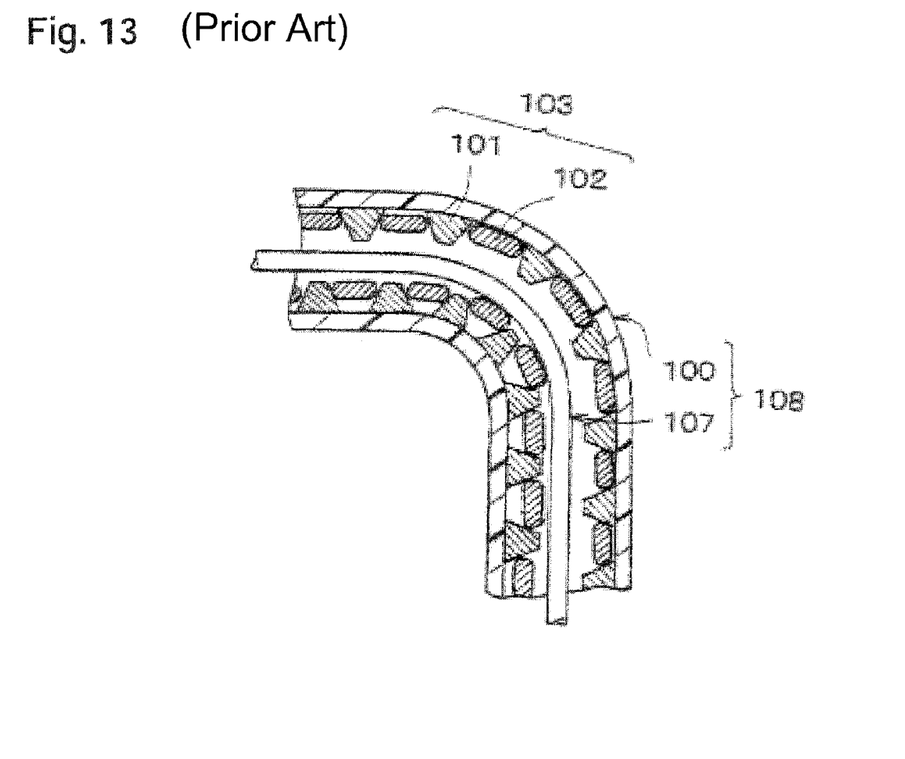
FIG. 13 is a cross section showing the action of the outer casing of FIG. 12.

In this outer casing 100, when it extends in a straight line, the oval wire 102 is in the mid position of the irregular shape wire 101; and when it is bended like FIG. 13, the oval wire 102 of the inside of the bending moves toward the front edge side of the irregular shape wire 101, and the oval wire 102 of the outside of the bending moves toward the root side. Hence, small bending is possible. Further, it is said that the amount of the variation of the freeplay length (the length of the inner cable being out of the outer casing) of the inner cable 107 is small, the transmission efficiency becomes better, and the operating loss is reduced because the action of the driving portion is sufficiently transmitted to the driven portion (the left column of the third page, 17th line-end line), when an inner cable 107 is inserted into the outer casing 100 to constitute a control cable 108.

The control cable 108 is a cable in which the both edges of the inner cable 107 is latched to a drive portion and a driven portion respectively, the inner cable 107 slides inside the inner hole of the outer casing 100 by pushing and pulling the drive portion, and the motion of the inner cable is transmitted to the driven portion to remote-control an equipment (the left column of the second page, line 2 to 10).

Figure 14:
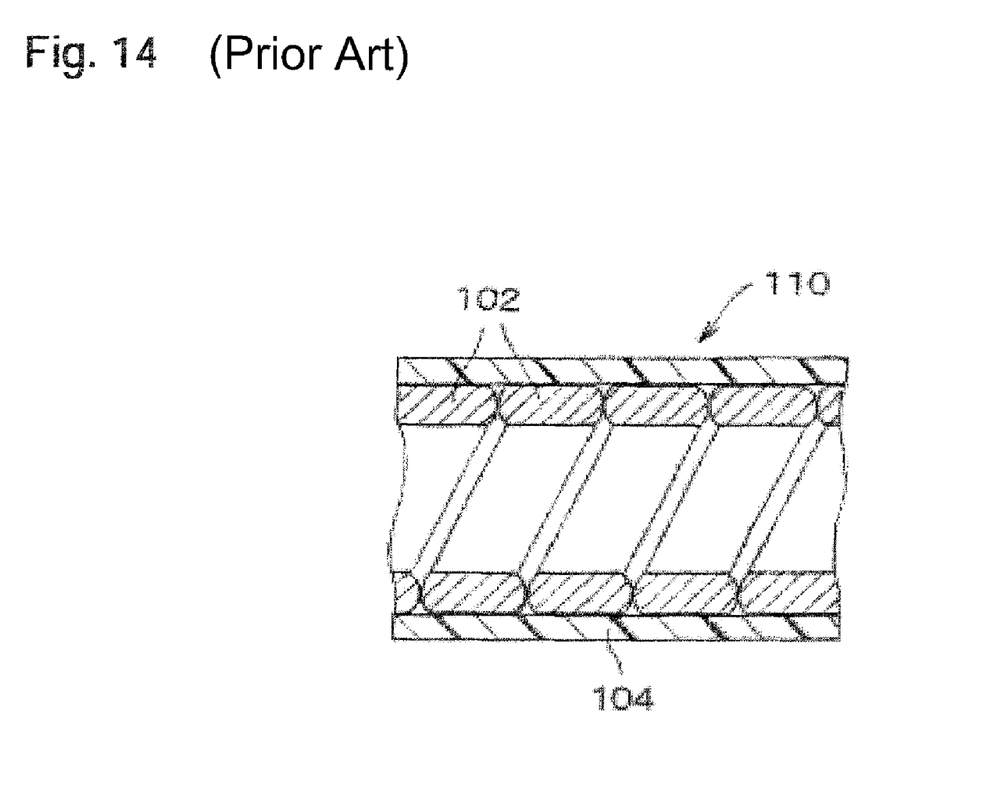
FIG. 14 a cross section showing the other example of conventional outer casing.

In Patent Document 2, as shown in FIG. 14, an outer casing 110 is disclosed. The outer casing 110 comprises a spiral tube constituted by thickly winding only an oval wire 102 in spiral and a synthetic resin layer 104 provided on its periphery. This outer casing 110 is used in a control cable (transmission cable), where it is combined with an inner cable. The end of the driven portion side of the inner cable is latched and the end of the drive portion side is pull-operated, and the driven portion side of the outer casing 110 is push-operated. In this case, the control cable is bended for cabling.

DISCLOSURE OF INVENTION

Problems to be Resolved by the Invention

The control cable 108 using the outer casing 100 of Patent Document 1 has a merit that the variation of the freeplay length is small because the moving stroke of the oval wire 102 is large. However, due to the smallness of the pitch, the rigidity of the outer casing 100 becomes rather small compared with usual control cables, and the stroke loss (the amount of the reduced stroke of the driven side with regard to the stroke of drive side) become large.

In the outer casing 110 of Patent Document 2, the stroke loss is small, but there is a problem that the freeplay length varies when the degree of the bending of the outer casing varies. This invention is directed to provide a control cable in which the variation of freeplay length is small when the degree of bending varies.

Means of Solving the Problems

The outer casing for a control cable of this invention comprises an armor layer formed by thickly winding a metal wire in spiral, and a coating made of synthetic resin covering the surface of the armor layer. The armor layer is equipped with a two threads coil configuration. The armor layer has a trapezoidal wire having trapezoidal cross section whose the width of inside is narrow, and an intervening wire intervened between the trapezoidal wire having about round shape or oval shape. The portion of the intervening wire contacting the slanted portion of the trapezoidal wire is circular arc. The ratio of the thickness of the intervening wire to the thickness of the trapezoidal wire is 0.5 to 1, and the ratio of the winding pitch of the spiral to the outer diameter of the armor is 0.25 to 0.8.

In such outer casing, it is preferable that the ratio of the width in the axis direction of the intervening wire to the width of the bottom of the trapezoidal wire is 0.5 to 1.5. Further it is preferable that the ratio of the thickness of the intervening wire to the thickness of the trapezoidal wire is 0.65 to 1. Moreover, it is preferable that the ratio of the winding pitch of the spiral to the outer diameter of the armor layer is 0.55 to 0.7.

And, it is preferable that the angle of the slanted plane of the trapezoid of the trapezoidal wire is 45 to 85 degree. It is more preferable that the ratio of the thickness of the trapezoidal wire to the outer diameter of the armor layer is 0.09 to 0.2. Further, in any of the above described outer casing, it is preferable that a liner composed of a tube made of synthetic resin is provided on the inside surface.

The outer casing for a control cable of this invention includes any of the outer casing described above and an inner cable inserted into the outer casing slidably.

Effect of the Invention

In the outer casing of this invention, since the ratio of the thickness of the intervening wire to the thickness of the trapezoidal wire is 0.5 to 1, and the ratio of winding pitch of the spiral to the outer diameter of the armor layer is 0.25 to 0.8, it has outer rigidity against a load while having more flexibility to bending at the same time. Hence, when it is combined with the inner cable, the stroke loss is small, and furthermore, the variation of the freeplay length is small even if the degree of the bending varies. Further, it has a merit to avoid the buckling against a local buckling load applied to the bending portion of the outer casing.

Moreover, when the ratio of the width in the axial direction of the intervening wire to the width of the bottom of the trapezoidal wire is 0.5 to 1.5, it is possible to have the outer rigidity against a load while having more flexibility to bending at the same time. The highness of outer rigidity against the load means substantially the highness against a crushing load. Further, in the case where the ratio of the thickness of intervening wire to the thickness of the trapezoidal wire is 0.65 to 1, it is possible to have the outer rigidity against the load while having more flexibility to bending at the same time. And, when the ratio of the winding pitch of the spiral to the outer diameter of the armor is 0.55 to 0.7, it is possible to have the rigidity against the load while having more flexibility to bending at the same time.

Additionally, when the angle of the slanted plane of the trapezoid of the trapezoidal wire is 45 to 85 degrees, the variation of freeplay length is further small. When the ratio of the thickness of the trapezoidal wire to the outer diameter of the armor layer is 0.09 to 0.2, the outer rigidity becomes higher. Further, in any of the above outer casing, when the liner composed of a tube made of synthetic resin is provided inside of armor layer, it is preferable because the sliding resistance of the inner cable becomes small.

In the control cable of this invention, since it employs the above described outer casing; the stroke loss is small, and furthermore, the variation of freeplay length is small even if the degree of bending varies. Further, it has a merit to avoid the buckling against the local buckling load.

BEST MODE FOR CARRYING OUT THE INVENTION

Next, referencing the drawings, the embodiments of the outer casing and the control cable of this invention are described.

Figure 1:
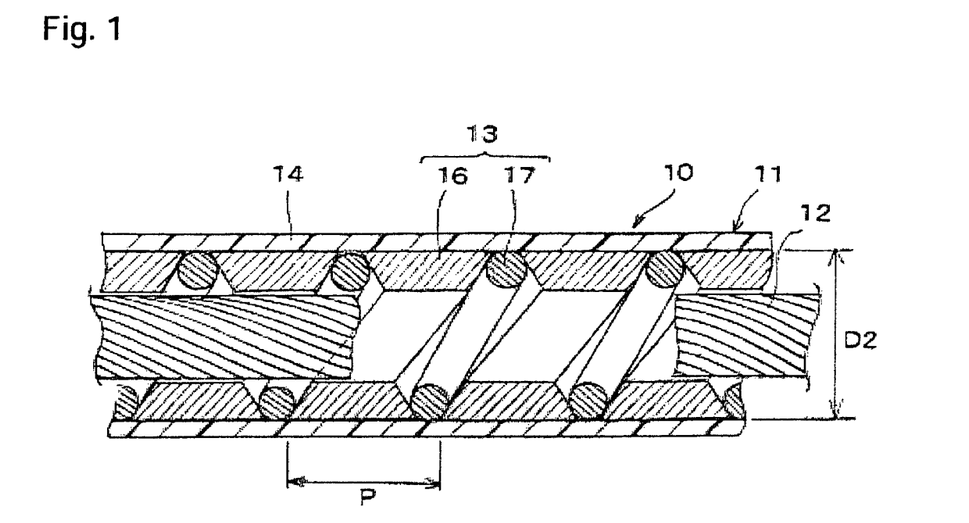
FIG. 1 is a cross section showing an embodiment of the control cable using the outer casing of this invention.

A control cable 10 shown in FIG. 1 comprises a tube-like outer casing 11 having flexibility, and an inner cable 12 slidably housed in the outer casing. The outer casing 11 is the embodiment of the outer casing of this invention and comprises an armor layer 13 in which a metal wire is thickly wound in spiral, and a coating layer 14 covering the surface of the armor layer.

Figure 3:
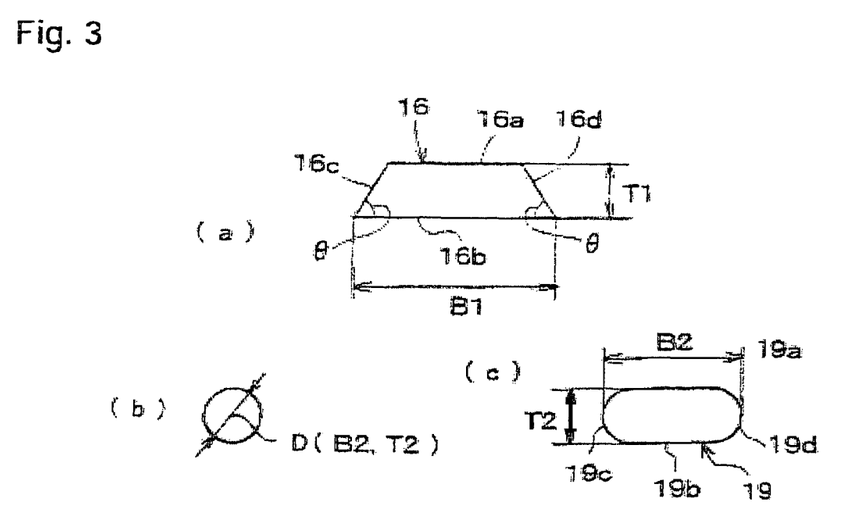
FIGS. 3a, 3b, and 3c are cross sections respectively showing the embodiment of the trapezoidal wire, the round wire, and the oval wire related to this invention.

The armor layer 13 is equipped with a two threads coil configuration, which comprises a trapezoidal wire 16 made of metal having trapezoidal cross section where the width of inside surface is narrow, and a round wire (intervening wire) 17 intervened in between the each winding of the trapezoidal wire. The shape of the cross section of the trapezoidal wire 16 is trapezoid, as shown in FIG. 3a, where the upper side 16a (upper bottom) is narrow, bottom side 16b (lower bottom) is wide, and the right and left side (legs) 16c, 16d are slanted. The length and the angles θ of the right and left side 16c, 16d are equal. Namely, it is isosceles trapezoid. The trapezoidal wire 16 and the round wire 17 can be made into an armor layer 13 by winding while laying side by side around a core material, or by pushing against to a dice with its external shape being regulated, and shapes into a two threads coil shape. And in a method to wind around a core material, by extracting the core material later, it can be made into an armor layer 13. The trapezoidal wire 16 is wound spirally by making its upper side 16a to be inside. Then, a coating 14 is prepared for the outer casing to be obtained. The coating 14 can be prepared by extrusion also. As for the material of the trapezoidal wire 16 and the round wire 17, steel wire, galvanized steel wire, or stainless steel wire etc. may be used.

[Width of Intervening Wire/Width of Trapezoidal Wire]

The ratio of the diameter of the round wire 17 (width: reference numeral D of FIG. 3b) to the width B1 of the bottom of the trapezoidal wire 16 (D/B1) is 0.3 to 2.0. When this ratio becomes smaller than 0.3, in other words, when the trapezoidal wire 15 whose width larger than 3.33 times compared with the diameter of the round wire 17 is used, the stroke loss becomes extremely large. And, when the ratio becomes larger than 2.0, in other words, when the width B1 of the bottom of the trapezoidal wire 16 becomes about 0.5 times of the diameter D of the round wire 17, the rigidity of the trapezoidal wire 16 becomes low making it difficult to shape. Further, the lower limit of the above described ratio (D/B1) is more preferable to be about 0.5 so as to lessen the stroke loss. Furthermore, if the upper limit is about 1, the shapability of the wire is preferable.

As the intervening wire, other than the round wire 17, such as the outer casing 18 shown in FIG. 2, a flat metal wire whose cross section at its both ends is circular arc, in other words, a rolled wire 19 (hereinafter referred to as oval wire) whose cross section is about oval can be used. As shown in FIG. 3c, the upper and the lower sides 19a, 19b of the oval wire 19 are in parallel, the right and left end portion 19c, 19d are about semicircle. The material of the oval wire 19 is similar to that of the round wire 17. The lower limit of the ratio (B2/B1) of the width B2 of the oval wire to the width B1 of the bottom of the trapezoidal wire is 03, which is same as the case of the round wire 17, and is preferably 0.5. The upper limit is 2, preferably about 1.5. This limit is based on the mass producibility of the case to shape a round wire into oval wire 19 by rolling. In addition, it can be produced by drawing. The width B2 of the oval wire 19 is, as shown in FIG. 3c, the whole width including the circular arc of the both sides.

Figure 4:
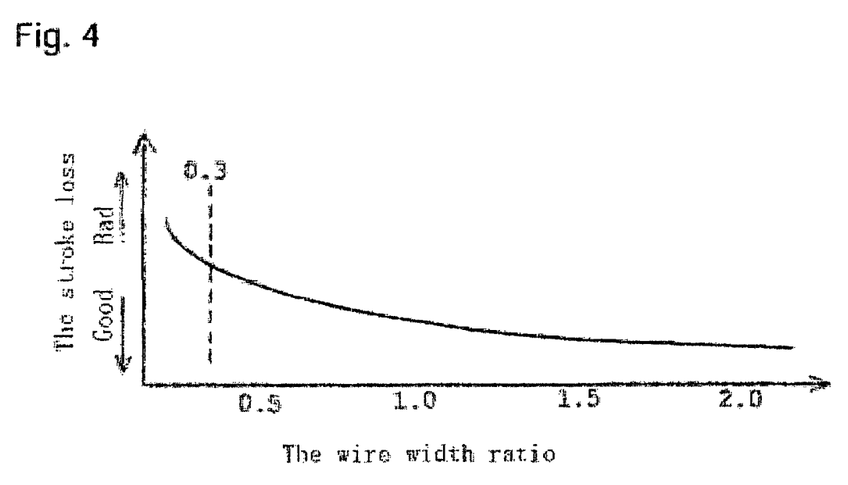
FIG. 4 is a graph showing the relation between the ratio of the wire width and the stroke loss.

In FIG. 4, a graph is conceptually shown, which is the relation between the diameter D of the round wire (hereinafter, regarded to be B2 in conformity to the oval wire) or the ratio (width ratio: B2/B1) of the width B2 of the oval wire 19 to the width B1 of the bottom of the trapezoidal wire and the stroke loss. As shown in the graph, when the wire width ratio becomes smaller than 0.3, the stroke loss become extremely worse. As the wire width ratio becomes large, the stroke loss gradually becomes small, but when it exceeds 2.0, the stroke loss nearly varies and the mass producibility of the rolled wire becomes low. Accordingly, this invention employs the range of 0.3 to 2. Further, as the range to satisfy the both side of the stroke loss and the producibility, 0.5 to 1.5 is preferable.

[Thickness of Intervening Wire/Thickness of Trapezoidal Wire]

The range of the ratio (T2/T1) of the thickness T2 (in the round wire 17, diameter D) of the intervening wire which is the round wire 17 or the oval wire 19 to the thickness T1 of the trapezoidal wire is 0.5 to 1. When it is smaller than 0.5, the moving stroke (stroke from inside to outside, and stroke from outside to inside) of the intervening wire in the time that the outer casing is bended becomes large. Hence, though there is a merit that the variation of the freeplay length becomes small, the rigidity of the outer casing becomes low, and the stroke loss becomes large. "The rigidity of the outer casing" means in this description is that the rigidity against the axial compressing force (resistance to elastic deformation). On the other hand, the upper limit of the thickness ratio is 1, in other words, the thickness of the intervening wire is up until the same as that of the trapezoidal wire 16. When the thickness of the intervening wire becomes large, the stroke in the time of making it to be bended becomes small losing almost of the merit to use the trapezoidal wire.

Moreover, when the outer casing is allocated in bending state (see FIG. 7, FIG. 8) and a tension is applied to the inner cable, the outer casing intends to shrink toward the center of the curvature radius (bending radius) of the bending of the outer casing. In this occasion, if the movement of the intervening wire is not constrained and is made free, the shrink in the direction toward the center becomes large, the permanent deformation becomes large. Further, it becomes weak to local buckling also. The moving stroke in the radius direction of the intervening wire while the bending, is preferable to be about 0.01 to 0.5 times of the thickness T2 of the intervening wire.

When the thickness of the intervening wire and the trapezoidal wire is same (thickness ratio T2/T1=1), the inward and outward movement of the bending is constrained, but since there are deflection and elongation etc. of the synthetic resin layer, actually a certain amount of movement is secured, Therefore, it is preferable because the variation of freeplay length is small, and furthermore, the shrink toward the center when the outer casing is bended is small. FIG. 1 and FIG. 2 show the case where this thickness ratio is 1. In addition, when the range of the thickness ratio is 0.6 to 1, particularly, 0.8 to 1, there is about the same effect.

[Winding Pitch/Outer Diameter]

The range of the ratio of the winding pitch P of the spiral of the trapezoidal wire 16 and the intervening wire 17, 19 to the outer diameter D2 of the armor layer is 0.25 to 0.8, preferably 0.55 to 0.7. When this ratio becomes smaller than 0.25, the rigidity of the axial direction of the outer casing becomes low, and the stroke loss becomes large. And, when it is toward 0.55 or more, the stroke loss is further small. On the other hand, when the ratio exceeds 0.8, though the rigidity of the axial direction of the outer casing becomes high, the flexibility when making it to be bended becomes low and it is not practical. Further, when it is made to be toward 0.7 or lower, the rigidity is suitable and the sufficient flexibility can be obtained.

[Slant Angle of Trapezoid]

Figure 5:
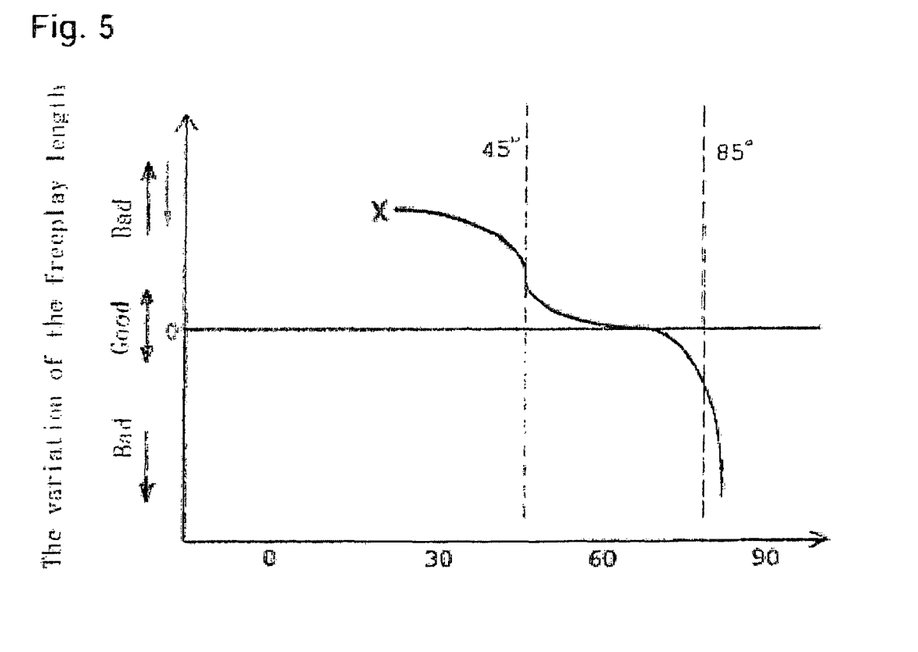
FIG. 5 is a graph showing the relation between the angle of slanted plane of the trapezoidal wire and the freeplay length.

The angle θ composed of the side (oblique line) 16c, 16d and the lower side 16b of the trapezoidal wire 16 is preferable to be 45 to 85 degrees. As shown in FIG. 5, when this angle is less than 45 degrees, the inner cable protrudes from the end of the outer casing making the freeplay length particularly long while bending. On the other hand, when the angle exceeds 85 degrees, the freeplay length becomes small inversely. Further, as found from the FIG. 5, in the case that the slant angle is 55 to 70 degrees, particularly, 60 to 65 degrees, the freeplay length does not almost vary, which is more preferable.

[Ratio of Trapezoidal Wire Thickness to Armor Layer Diameter]

The ratio (T1/D2) of the thickness T1 of the trapezoidal wire 16 to the outer diameter D2 of the armor layer is preferable to be about 0.09 to 0.2, and particularly 0.15 or less is preferable. When this ratio is less than 0.09, the rigidity becomes too low, and when it exceeds 0.2, the rigidity becomes too high and causes a problem in the workability in cabling. In addition, being 0.15 or less, the rigidity is suitable and is easy for cabling.

[Ratio of Trapezoidal Wire Thickness to Width]

The ratio (T1/B1) of the thickness T1 of the intervening wire to the width B1 is about 1 to 2. When this ratio is less than 1, it becomes hard to secure the angle of the slanted plane, and when it is larger than 2, the producibility becomes inferior.

[Synthetic Resin Coating]

The material and the thickness of the coating 14 made of synthetic resin are same as the conventional outer casing. For example, polyethylene, polypropylene, polyamide etc. may be used. The thickness is about 0.4 to 2 mm, particularly about 0.5 to 1 mm is preferable. The coating 14 can be prepared around the armor layer 13 by extrusion etc. The diameter of the coating 14, namely the whole diameter of the outer casing 11, is about 4 to 20 mm, particularly, about 5 to 12 mm. This may vary according to the usage and the load.

[Liner]

Figure 6:
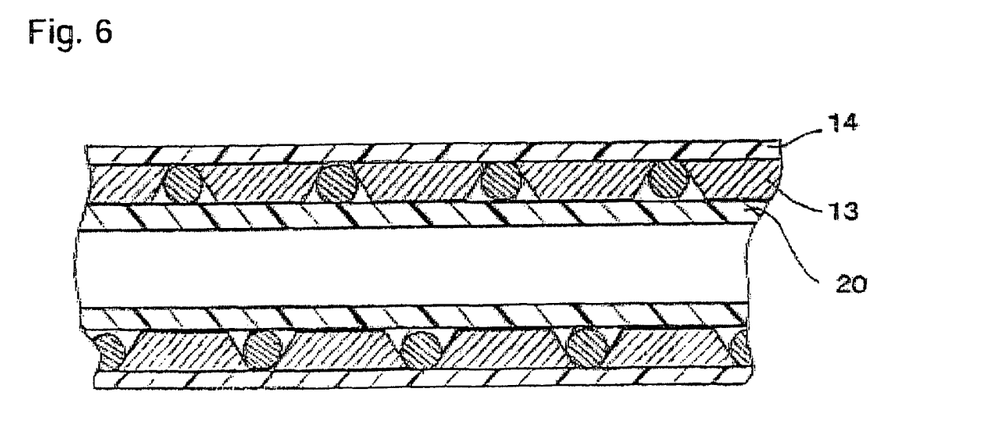
FIG. 6 is a cross section showing further the other embodiment of the outer casing of this invention.

In any of the outer casing described above, for example as shown in FIG. 6, it is also possible to provide a tube-like liner 20 made of synthetic resin inside of the armor layer 13. The material and the thickness of the liner are similar to those of conventional liners, and as the material, polyethylene, polypropylene, fluorocarbon resin etc. may be used. The outer diameter is about 2 to 7 mm, particularly 2.5 to 6 mm is preferable. The liner 20 is formed into a tube-like shape by extrusion etc. and then inserted into the armor layer 13. Moreover, the liner 20 may be produced precedently, and the trapezoidal wire 16 and the intervening wire 17, 19 may be wound around the liner 20 by pressing a dice with its outer diameter being constrained.

[Inner cable]

The outer casing 11 constituted as above is made into a control cable 10 by combining with an inner cable 12. As the inner cable 12, either of the inner cable used for a pull control cable and that used for a push control cable can be used. In the case of the inner cable used for a pull control cable, the cable in which a plurality of metal element wires is twisted is used. The whole diameter of the inner cable is about 1 to 6 mm, particularly about 1.5 to 3 mm, and as the material, a steel wire, and a stainless steel wire are employed.

The difference between the outer diameter of the inner cable 12 and the inner diameter of the trapezoidal wire 16 is about 0.3 to 0.7 mm, particularly about 0.4 to 0.6 mm. It is same as the case where the liner is used. In any of the case, a lubricant such as grease is charged between the inner cable 12 and the outer casing 11. Despite of the presence or absence of the liner 20, the lubricant is made to enter into the intervening wire 17, 19 and the trapezoidal wire 16 also.

In a general outer casing, when bended, it receives compressive force in between the element wires in its center side (inside), and it receives tensility in its outside. But, since it has the armor layer, it does not shrink in its inside, and in its out side, since it stretches in some degree, the length of the cabling along the center line of the outer casing stretches in some degree compared with that in straight state. Hence, in the general outer casing, the inner cable being out of the outer casing is pulled into the outer casing making the freeplay length to be minus side.

Figure 7:
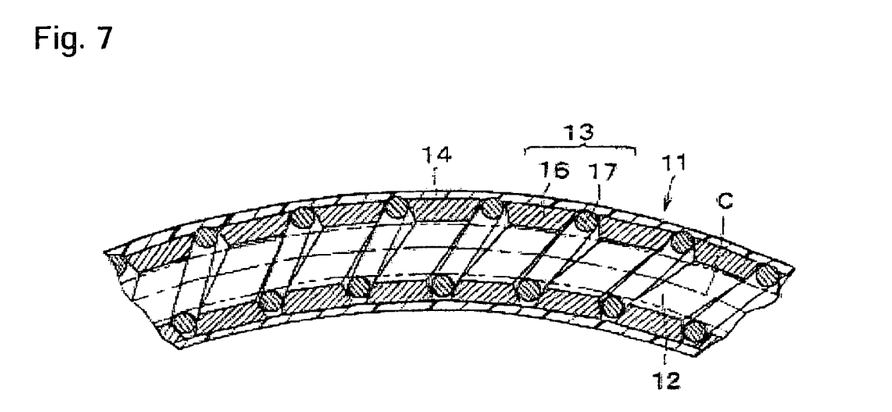
FIG. 7 is a cross section showing the bending state of the outer casing of FIG. 1.

However, in the control cable 10 shown in FIG. 1, the adjacent trapezoidal wires 16 intend to approach mutually based on the compressing force in the inside of the bending, when it is bended like shown in FIG. 7. Hence the round wire 17 is pushed out to the inside (outside of bending) by the slanted plane of the trapezoidal wire 16, and moves toward the center line in some degree. On the other hand, in the outside of the bending, the trapezoidal wire 16 intends to depart mutually by the tensility, the round wire 17 moves toward the outside (coating side) of the bending in some degrees. As the result, the whole outer casing 10 behaves as if the bending has elasticity despite of being equipped with rigidity to bear the axial compression and the tensility, thereby the cabling length along the center line of the outer casing 10 does not change compared with that in the straight state. Accordingly, the variation in the freeplay length is small.

This is the same when the inner cable 12 is pull-operated in the reverse direction, and is the same when the direction of bending changes. In addition, in the case of pull control cable, there is no impact on the outside of the bending since the inner cable is not pull-operated. Further, in the outer casing with a liner in which the liner is fitted inside of the armor layer, may be the effect works similarly. And also in the case of the push pull control cable, the effect that the variation of the freeplay length is small works since the cabling length along the center line of the bended outer casing does not change from the cabling length in the straight state. In the bending state, the inner cable slidely contacts to the inner surface of the outside of the bending (in FIG. 7, inner surface of the upper side), and since the clearance deviates in between the inside of the bending, it does not give influence. And, in the case that the diameter of the round wire 17 is substantially same as the height of the trapezoidal wire 16 (the case that the diameter of the round wire D/the height T1 of the trapezoidal wire 16=about 0.9 to 1), the variation of the freeplay length happens to become plus side, since in the inside of the bending the round wire 17 protrudes from the upper surface of the trapezoidal wire 16 in some degrees. But, the absolute value of the variation is small.

Figure 2:
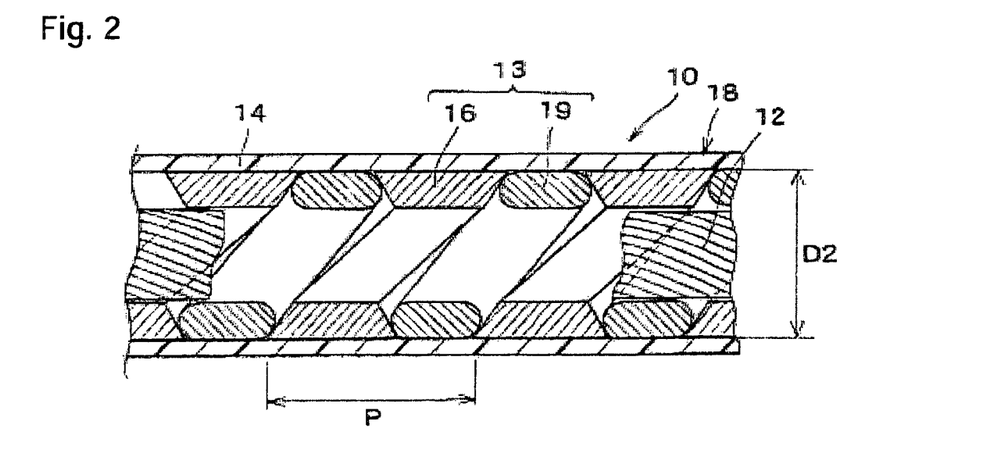
FIG. 2 is a cross section showing the other embodiment of the outer casing of this invention.
Figure 8:
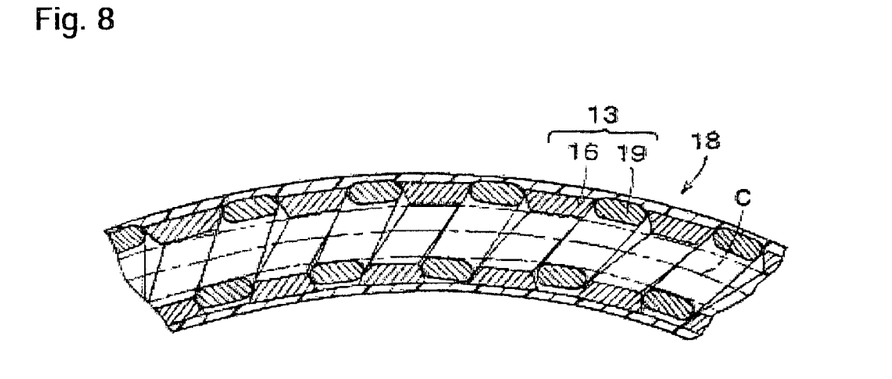
FIG. 8 is a cross section showing the bending state of the outer casing of FIG. 2.

In the outer casing 18 using the oval wire 19 of FIG. 2 as the intervening wire also, as shown in FIG. 8, the same effect as the case using the round wire 17 as the intervening wire works.

Figure 9:
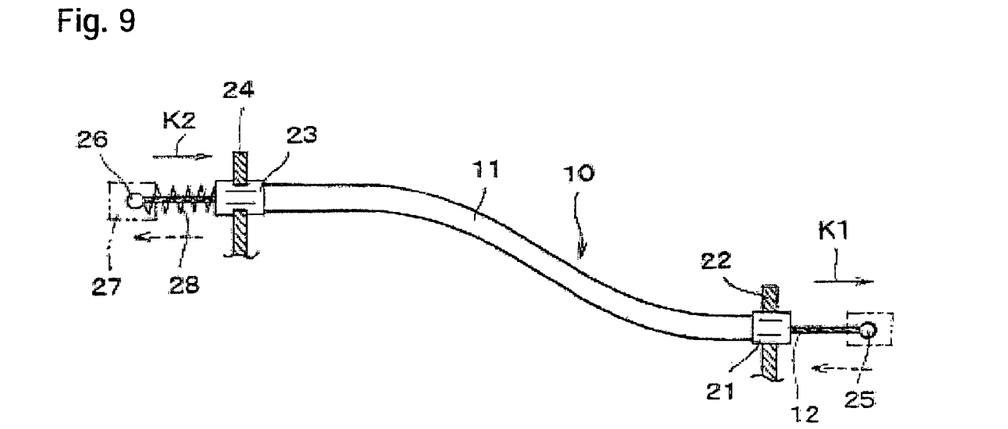
FIG. 9 is an outline side view showing an example of the used state of the control cable of this invention.

The above described control cable 10 of two threads configuration (two springs configuration) is used so that one end 21 of the outer casing 11 is fixed to a bracket 22 of operation side, and another end 23 is fixed to a bracket 24 of motion side (driven side), as shown in FIG. 9. In this case, the end 26 of the motion side and a driven member 27 latched to the end 26, for example, a lever etc. can be pulled to the arrowhead direction K2 by pulling the end 25 of the operation side of the inner cable 12 to the arrowhead direction K1. By releasing the pulling operation of the end 25 of the operation side of the inner cable, the inner cable 12 is pull-operated to the inverse direction to the arrowhead direction K1, K2 by a return spring 28.

In a remote operation system using such control cable 10, for example, when the motion side bracket 24 is moved up and down by the other drive mechanism, the bending state of the outer casing varies, and the curvature radius of the bending varies. However, the variation of the freeplay length of the inner cable 12 is small because the outer casing of the two threads coil structure by the trapezoidal wire and the intervening wire is employed. Accordingly, the driven member 27 does not move unintendedly accompanying the movement of the bracket 24.

Figure 10:
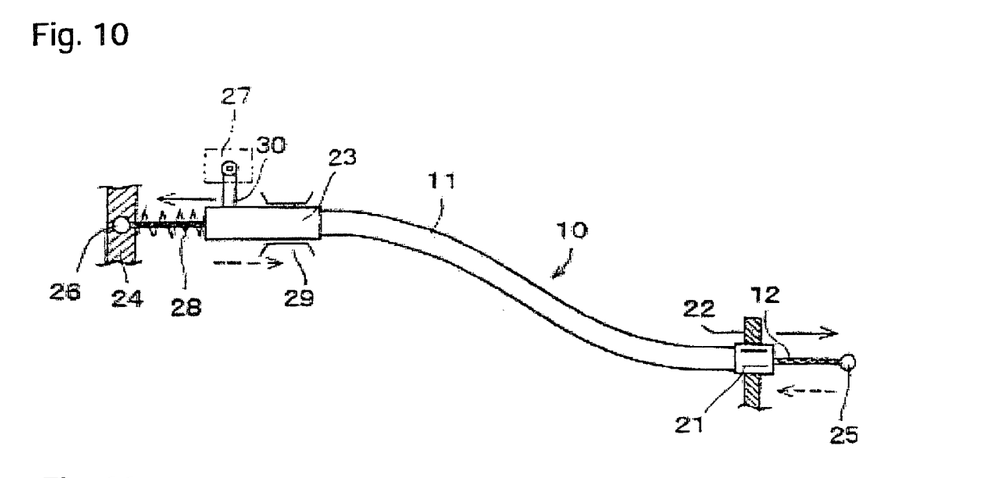
FIG. 10 is an outline side view showing the other example of the used state of the control cable of this invention.

In the remote operation system shown in FIG. 10, same as the case of Patent Document 2, the end 26 of the motion side of the inner cable 12 is latched to the bracket 24 of the motion side, and the end 23 of the motion side of the outer casing 11 is slidably guided in the axial direction by a guide 29. And, the driven member 27 is coupled to the coupling member 30 which is prepared in the end 23 of the motion side of the outer casing 11. Moreover, the return spring 28 is interposed between the end 23 of the motion side of the outer casing 23 and the bracket 24.

In this, when the end 25 of the operation side of the inner cable 12 is pulled, the path of the bending varies so that the cabling length of the inner cable 12 in the outer casing 11 becomes short. Hence, the end 23 of the motion side of the outer casing 11 is pushed out and moves toward the front side in the guide 29. Thereby, the driven member 27 can be push-operated through the coupling member 30. Finally, when the pulled action is stopped, the end 23 of the motion side of the outer casing 11 is pushed back returning to the original state by the action of the return spring 28.

In this, when the bracket 26 of the motion side does not move, the bending state of the outer casing 11 varies by the operation of the inner cable 12, and the curvature radius of the bending varies. However, since the outer casing of the two threads coil structure by the above described trapezoidal wire and the intervening wire is employed, the variation of the freeplay length of the inner cable 12 is small. Accordingly, the operation of the inner cable can be transmitted to the driven member 27 precisely.

Next, referencing embodiments and comparative examples, the effect of this invention is described.

Embodiment 1

A trapezoidal wire of the width B1: 1.0 mm, the thickness T1: 0.6 mm, the slanted angle θ: 65 degrees, the material: hard drawn steel wire, and an oval wire of the width B2: 0.5 mm, the thickness T2: 0.6 mm, the radius of the circular arc: 0.4 mm, is spirally wound as shown in FIG. 2 to produce an armor layer of the inner diameter: 2.8 mm, the outer diameter: 4.0 mm. Covering the armor layer with polypropylene resin so as to be the thickness 0.5 mm, an outer casing as shown in FIG. 2 is produced. The wire width ratio (B2/B1) of this is 0.5, and the ratio (T1/D2) of the thickness to the outer diameter of the armor is 0.15.

An inner cable produced by twisting 7 twisted wires, in which 7 hard drawn wires having diameter of 0.185 mm being twisted, was inserted into the outer casing to produce a control cable of the embodiment 1. Between the inner cable and the outer casing, silicone system grease was charged.

Embodiment 2 to 4

As the control cable of the embodiment 2, the width B1 of the trapezoidal wire having 1.4 mm and the width B2 of the oval wire having 1.2 mm (B2/B1=0.86) was made. As the control cable of the embodiment 3, the width B1 of the trapezoidal wire having be 1.4 mm, the width B2 of the oval wire having 1.0 mm (B2/B1=0.71) was made. And as the control cable of the embodiment 4, the width B1 of the trapezoidal wire having 2.0 mm, the width B2 of the oval wire having 1.2 mm (B2/B1=0.80) was made. The numbers other than the above were made same as the embodiment 1.

COMPARATIVE EXAMPLE 1 to 2

The control cable of the comparative example 1 was produced making it same as the embodiment 1 excepting that the width B1 of the trapezoidal wire was made to be 0.4 mm and the width B2 of the oval wire was made to be 0.6 mm. The wire width ratio of this (B2/B1) is 1.50. And, for the comparative example 2, the cable in which the width B1 of the trapezoidal wire having 0.6 mm, the width B2 of the oval wire having 0.6 mm was made, however it could not be winded in good condition due to the occurrence of the saw tooth shape. The wire width ratio (B2/B1) is 0.75. Additionally, the occurrence of the saw tooth shape means that the element wire cross section is not horizontal with regard to the longitudinal direction of the outer casing. For example, it is in such state that only one side of the slanted plane of the trapezoidal wire laps over the adjacent oval wire so as to run aground, the cross section of the trapezoidal wire slants somewhat, and the cross section of the oval wire slants in the same direction.

The data of the embodiments 1 to 4 and the comparative examples 1 to 2 are summarized as Table 1. In addition, since the change of the width of the trapezoidal wire changes the pitch of the spiral, the pitch, the outer diameter of the armor layer, and the ratio of the both were also listed in table 1.

TABLE 1

[Wire width ratio]

| | WIRE WIDTH RATIO OVAL/TRAPE-ZOIDAL(mm) B2/B1 = RATIO | THICKNESS RATIO OVAL/TRAPE-ZOIDAL(mm) T2/T1 = RATIO | PITCH/ARMOR LAYER OUTER DIAMETER RATIO PITCH/OUTER DIAMETER(mm) P/D2 = RATIO | TRAPEZOIDAL WIRE SLANT ANGLE (degree) |
|---|---|---|---|---|
| Embodiment 1 | 0.5/1.0 = 0.5 | 0.6/0.6 = 1 | 1.4/4.0 = 0.35 | 65 |
| Embodiment 2 | 1.2/1.4 = 0.86 | 0.6/0.6 = 1 | 1.6/4.0 = 0.40 | 65 |

TABLE 1-continued

[Wire width ratio]

|  | WIRE WIDTH RATIO OVAL/TRAPE-ZOIDAL(mm) B2/B1 = RATIO | THICKNESS RATIO OVAL/TRAPE-ZOIDAL(mm) T2/T1 = RATIO | PITCH/ARMOR LAYER OUTER DIAMETER RATIO PITCH/OUTER DIAMETER(mm) P/D2 = RATIO | TRAPEZOIDAL WIRE SLANT ANGLE (degree) |
|---|---|---|---|---|
| Embodiment 3 | 1.0/1.4 = 0.71 | 0.6/0.6 = 1 | 2.3/4.0 = 0.58 | 65 |
| Embodiment 4 | 1.2/2.0 = 0.60 | 0.6/0.6 = 1 | 3.2/4.0 = 0.80 | 65 |
| Comparative Example 1 | 0.6/0.4 = 1.5 | 0.6/0.6 = 1 | 0.9/4.0 = 0.23 | 65 |
| Comparative Example 2 | 1.5/2.0 = 0.75 | 0.6/0.6 = 1 | 3.4/4.0 = 0.85 | 65 |

Embodiment 5 to 7

The embodiment 5, 6, 7 having the thickness T2 of the oval wire to be 0.45 mm, 0.4 mm, 0.3 mm respectively were produced. The numbers other than the above were made same as the embodiment 3. Namely, the thickness of the trapezoidal wire is 0.6 mm, the width is 1.4 mm, the width B2 of the oval wire is 1.0 mm etc.

COMPARATIVE EXAMPLE 3

The comparative example 3 having the thickness of the oval wire to be 0.25 mm and other numbers to be same as embodiment 3 were produced. In Table 2, the data of the embodiment 5 to 7 and the comparative example 3 are shown in a lump.

[Thickness ratio]

|  | WIRE WIDTH RATIO OVAL/TRAPE-ZOIDAL(mm) B2/B1 = RATIO | THICKNESS RATIO OVAL/TRAPE-ZOIDAL(mm) T2/T1 = RATIO | PITCH/ARMOR LAYER OUTER DIAMETER RATIO PITCH/OUTER DIAMETER(mm) P/D2 = RATIO | TRAPEZOIDAL WIRE SLANT ANGLE (degree) |
|---|---|---|---|---|
| Embodiment 5 | 1.0/1.4 = 0.71 | 0.45/0.6 = 0.75 | 2.3/4.0 = 0.58 | 65 |
| Embodiment 6 | 1.0/1.4 = 0.71 | 0.4/0.6 = 0.67 | 2.3/4.0 = 0.58 | 65 |
| Embodiment 7 | 1.0/1.4 = 0.71 | 0.3/0.6 = 0.50 | 2.3/4.0 = 0.58 | 65 |
| Comparative Example 3 | 1.0/1.4 = 0.71 | 0.25/0.6 = 0.42 | 2.3/4.0 = 0.58 | 65 |

Embodiment 8 to 9

The embodiment 8, 9 having the slant angle θ to be 80 degrees, 45 degrees, respectively, and other numbers to be same as embodiment 3 were produced.

COMPARATIVE EXAMPLE 4 to 5

The comparative example 4 having the slant angle θ to be 90 degrees, and other numbers to be same as embodiment 3 was produced. Additionally, the control cable of the comparative example 5 was intended to be produced using a trapezoidal wire whose slant angle was made to be 30 degrees. However, since the front end of the trapezoidal wire became too sharp, the trapezoidal wire was not processible. In Table 3, the data of the embodiment 8, 9 and the comparative example 4, 5 are shown in a lump.

TABLE 3

[Slant angle]

|  | WIRE WIDTH RATIO OVAL/TRAPE-ZOIDAL(mm) B2/B1 = RATIO | THICKNESS RATIO OVAL/TRAPE-ZOIDAL(mm) T2/T1 = RATIO | PITCH/ARMOR LAYER OUTER DIAMETER RATIO PITCH/OUTER DIAMETER(mm) P/D2 = RATIO | TRAPEZOIDAL WIRE SLANT ANGLE (degree) |
|---|---|---|---|---|
| Embodiment 8 | 1.0/1.4 = 0.71 | 0.6/0.6 = 1.0 | 2.3/4.0 = 0.58 | 80 |
| Embodiment 9 | 1.0/1.4 = 0.71 | 0.6/0.6 = 1.0 | 2.0/4.0 = 0.50 | 45 |

TABLE 3-continued

[Slant angle]

| | WIRE WIDTH RATIO OVAL/TRAPE-ZOIDAL(mm) B2/B1 = RATIO | THICKNESS RATIO OVAL/TRAPE-ZOIDAL(mm) T2/T1 = RATIO | PITCH/ARMOR LAYER OUTER DIAMETER RATIO PITCH/OUTER DIAMETER(mm) P/D2 = RATIO | TRAPEZOIDAL WIRE SLANT ANGLE (degree) |
|---|---|---|---|---|
| Comparable Example 4 | 1.0/1.4 = 0.71 | 0.6/0.6 = 1.0 | 2.4/4.0 = 0.60 | 90 |
| Comparable Example 5 | 1.0/1.4 = 0.71 | 0.6/0.6 = 1.0 | 2.4/4.0 = 0.60 | 30 |

[Measuring Method]

Figure 11:
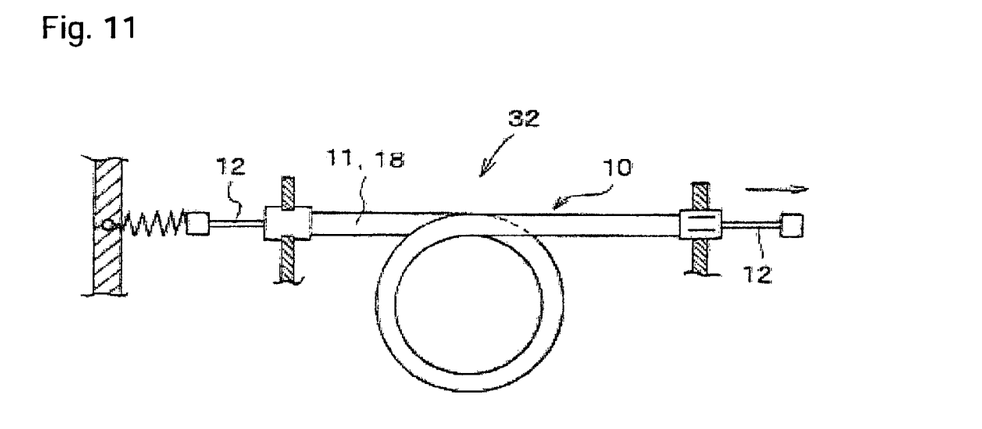
FIG. 11 is an outline drawing showing the measuring method related to this invention.

The control cable 10 of the embodiment 1 to 9, the comparative example 1 to 5 obtained by producing as above were assembled on a measuring instrument 32 shown in FIG. 11, and the stroke loss, the crushing load, the permanent deformation, and the freeplay length variation were measured. In the measurement of the stroke loss, the permanent deformation shown in FIG. 11, the curvature radius of the bending was made to be 80 mm, the angle was made to be 270 degrees. In the freeplay length variation, the curvature radius was made to be 50 mm, and the angle was made to be 540 degrees. The stroke loss is the difference between the amount of the operation in one end and the amount of the movement in another end, when the one end of the inner cable 12 is pulled by the force of 300 Newton. The crushing load is measure of the load that crushing occurred in the outer casing 11, 18 at the time the inner cable 12 was pulled. Note, however, in the case that the crushing did not occur at 2500N, it was made to be "2500 or more".

The permanent deformation is the length (mm) of margin out of the inner cable varied by the shrinking toward the center direction of the outer casing from the first time loading to the fifty times loading. The variation of the freeplay length is that of the length of margin out of the inner cable by the cabling under no load. Any of them was measured by a slide caliper. The results are shown in Table 4.

[Measured results]

| | STROKE LOSS (mm) | PERMANENT DEFOR-MATION (mm) | VARIATION OF FREE-PLAY LENGTH (mm) | STRENGTH AGAINST CRUSHING (N) |
|---|---|---|---|---|
| Embodiment 1 | 2.5 | 1.2 | +1.4 | 3000 |
| Embodiment 2 | 1.9 | 1.2 | +1.4 | 3200 |
| Embodiment 3 | 1.7 | 1.2 | +1.5 | 3500 |
| Embodiment 4 | 1.7 | 1.2 | +1.6 | 3500 |
| Embodiment 5 | 2.2 | 1.8 | +1.3 | 3200 |
| Embodiment 6 | 2.3 | 1.9 | +1.3 | 3000 |
| Embodiment 7 | 2.7 | 2.2 | +1.0 | 2400 |
| Embodiment 8 | 2.0 | 1.3 | −3.4 | 3200 |
| Embodiment 9 | 2.5 | 2.2 | +0.9 | 2500 |
| Comparative Example 1 | 4.2 | 1.2 | +1.6 | 2800 |
| Comparative Example 2 | — | — | — | — |
| Comparative Example 3 | 4.5 | 3.6 | +0.6 | 1500 |
| Comparative Example 4 | 2.1 | 1.3 | −10.5 | 3600 |
| Comparative Example 5 | — | — | — | — |

According to the embodiment 3 of Table 1, Table 2 and Table 4, when the ratio of the thickness T2 of the oval wire to the thickness T1 of the trapezoidal wire is 0.5 to 1, it is found that the stroke loss is 3 mm or less showing excellent rigidity. However, when the ratio is less than 0.5, it is found that the stroke loss become 4 mm or more, which is not preferable. Additionally, when this ratio exceeds 1, only the outer diameter of the armor layer becomes large, which is nonsense.

Moreover, according to Table 1 and Table 4, when the ratio of the winding pitch P of the spiral to the outer diameter D2 of the armor layer is 0.25 to 0.8, it is found that the stroke loss is 3 mm or less, which is excellent. However, when this ratio is less than 0.25, it is found that the stroke loss is 4 mm or more, which is not preferable. On the other hand, when this ratio exceeds 0.8, the saw tooth shape occurs in winding making the winding not possible (see Comparative example 2).

From the above, when the ratio of the width in the axial direction of the intervening wire to the width of the bottom of the trapezoidal wire is 0.3 to 2, the ratio of the thickness of the intervening wire to the thickness of the trapezoidal wire is 0.5 to 1, and the ratio of the winding pitch of the spiral to the outer diameter of the armor is 0.25 to 0.8, it is found that an excellent outer casing can be obtained.

Further, when the ratio of the thickness T2 of the oval wire to the thickness T1 of the trapezoidal wire is 0.65 to 1, the stroke loss becomes 2.5 mm or less, and it is more preferable. Furthermore, when the ratio of the pitch of the spiral to the outer diameter of the armor layer is 0.4 to 0.6, the stroke loss becomes 2.0 mm or less, and it is found to be more excellent.

Further, when the angle of the slanted plane of the trapezoidal wire is 45 to 85 degrees, since the variation of the freeplay length is ±5 mm or less, it is found that the outer casing is flexible. And, since the ratio of the thickness T2 of the oval wire to the outer diameter of the armor layer is 0.09 to 0.2, it is excellent in mass producibility.

The invention claimed is:

1. A control cable, comprising:
   an outer casing having an armor layer formed by thickly winding a metal wire in spiral, and a coating made of synthetic resin covering a surface of the armor layer;
   an inner cable slidably inserted into the outer casing, and
   a liner composed of a tube made of a synthetic resin provided on an inside surface of the armor layer,
   wherein the armor layer has a two thread coil configuration, the armor layer having a trapezoidal wire of trapezoidal cross section where a width of an inside surface is narrow, and an intervening wire intervened between the trapezoidal wire,
   wherein the intervening wire has about a round shape of which a portion contacting a slanted surface of the trapezoidal wire is a circular arc,
   wherein a ratio of a thickness of the intervening wire to a thickness of the trapezoidal wire is 0.65 to 1, a ratio of a winding pitch of the spiral to an outer diameter of the armor layer is 0.55 to 0.7, and a ratio of a width in an axis direction of the intervening wire to a width of a bottom of the trapezoidal wire is 0.5 to 1.5,
   wherein a difference between an outer diameter of the inner cable and an inner diameter of the liner is 0.3 to 0.7 mm.

2. The control cable according to claim 1, wherein an angle of the slanted plane of the trapezoidal wire is 45 to 85 degree.

3. The control cable according to claim 1, wherein a ratio of a thickness of the trapezoidal wire to an outer diameter of the armor layer is 0.09 to 0.2.

* * * * *